US012133607B2

United States Patent
Minerba et al.

(10) Patent No.: US 12,133,607 B2
(45) Date of Patent: *Nov. 5, 2024

(54) CAPSULE DISTRIBUTING DEVICE WITH OR WITHOUT ORIENTATION AND WITH BULK LOADING

(71) Applicant: MITACA S.R.L., Robecchetto con Induno (IT)

(72) Inventors: Francesco Minerba, Robecchetto con Induno (IT); Angelo Bonizzoni, Robecchetto con Induno (IT)

(73) Assignee: MITACA S.R.L., Robecchetto con Induno (IT)

( * ) Notice: Subject to any disclaimer, the term of this patent is extended or adjusted under 35 U.S.C. 154(b) by 984 days.

This patent is subject to a terminal disclaimer.

(21) Appl. No.: 17/255,850

(22) PCT Filed: Jun. 27, 2019

(86) PCT No.: PCT/EP2019/067206
§ 371 (c)(1),
(2) Date: Dec. 23, 2020

(87) PCT Pub. No.: WO2020/002526
PCT Pub. Date: Jan. 2, 2020

(65) Prior Publication Data
US 2021/0259457 A1    Aug. 26, 2021

(30) Foreign Application Priority Data
Jun. 28, 2018 (IT) .......... 102018000006752

(51) Int. Cl.
*A47J 31/36* (2006.01)
*A47J 31/52* (2006.01)
*B65G 11/02* (2006.01)

(52) U.S. Cl.
CPC ......... *A47J 31/3642* (2013.01); *A47J 31/525* (2018.08); *B65G 11/023* (2013.01)

(58) Field of Classification Search
CPC .. A47J 31/3642; A47J 31/525; A47J 31/3623; A47J 31/3633; A47J 31/407;
(Continued)

(56) References Cited

U.S. PATENT DOCUMENTS

| 2006/0124659 A1 | 6/2006 | Mosconi et al. |
| 2013/0186908 A1 | 7/2013 | Magno |

(Continued)

OTHER PUBLICATIONS

International Search Report and Written Opinion of the ISA for PCT/EP2019/067206 mailed Aug. 19, 2019, 11 pages.

*Primary Examiner* — Nathaniel E Wiehe
*Assistant Examiner* — Dilnessa B Belay
(74) *Attorney, Agent, or Firm* — NIXON & VANDERHYE (57) ABSTRACT

Disclosed is a device for distributing capsules, including a container apt to receive in bulk a plurality of capsules and an ordering assembly placed inside the container, apt to arrange the capsules vertically for subsequent distribution; wherein the ordering assembly includes a rotating helical screw for mixing capsules, mounted on a basket rotating together with it, the basket having an inclined upper wall or slide, such that its height varies gradually from a minimum to a maximum along its periphery, and an open vertical seat apt to accommodate a capsule placed vertically and to distribute it through an opening formed on the bottom wall of the container.

20 Claims, 14 Drawing Sheets

(58) Field of Classification Search
CPC ....... A47J 47/01; B65G 11/023; A47G 19/32; A47G 19/34
See application file for complete search history.

(56) References Cited

U.S. PATENT DOCUMENTS

2014/0166686 A1    6/2014  Righetti
2015/0040769 A1*   2/2015  Righetti ................ A47J 31/407
                                                        99/290

\* cited by examiner

CAPSULE DISTRIBUTING DEVICE WITH OR WITHOUT ORIENTATION AND WITH BULK LOADING

This application is the U.S. national phase of International Application No. PCT/EP2019/067206 filed Jun. 27, 2019 which designated the U.S. and claims priority to IT patent application No. 102018000006752 filed Jun. 28, 2018, the entire contents of each of which are hereby incorporated by reference.

BACKGROUND OF THE INVENTION

Field of the Invention

The object of the present invention is a capsule distributing device with or without orientation, and with bulk loading.

Optionally, the device according to the invention can be used to precisely insert a capsule, for example of coffee or other products, into the distributing unit of a machine for the production of a drink.

Here below we will mainly talk about coffee capsules, but it is clear that the concepts of the invention are applicable to any type of capsule.

Description of the Related Art

There are currently capsule distributors, wherein the capsules are arranged in an orderly manner, and from which the user can take one capsule at a time to introduce it into the distributing unit of a beverage production machine.

The drawback of such distributors is that they have a rather limited capacity and require an orderly loading of the capsules.

US 2015/0040769 A1 describes a capsule orientating device comprising a container suitable for receiving randomly orientated capsules, having a bottom wall provided with at least two openings reproducing the shape of the capsules. The container contains a rotor with pockets to accommodate the capsules arranged vertically, i.e. with the axis horizontal, to distribute them through the orientated openings provided in the bottom of the container. The rotor has a conical upper surface in which the opening for the entry of said pockets for the reception of the capsules is obtained. Such a conical shape of the rotor, even if equipped with mixing blades, makes it difficult to insert the capsules into the pockets and does not completely eliminate the possibility of jams or overlaps between the capsules.

SUMMARY OF THE INVENTION

It is therefore the object of the invention to eliminate the disadvantages of the known distributors mentioned above by providing a capsule distributor, in which the capsules are loaded in bulk.

Another object of the invention is to provide such a capsule distributor which is highly efficient, avoiding jamming of the capsules loaded in bulk during their path.

Yet another object of the invention is to provide such a capsule distributor configured in such a way as to distribute capsules without orientation, with a precise orientation, and which can be optionally installed directly on machines for the distributing of coffee or other beverages.

The distributor of capsules according to the invention, in its simplest embodiment, has the features of the appended independent claim 1.

Advantageous embodiments of the invention are disclosed by the dependent claims.

Substantially, the capsule distributing device, according to the invention, comprises a container capable of accommodating in bulk a plurality of capsules and an ordering assembly placed inside said container, capable of arranging said capsules vertically for subsequent distribution;

wherein said ordering assembly comprises a rotating helical screw for mixing capsules, mounted on a rotating basket together with it, said screw having a diameter increasing from its upper tip to the base, and said basket having an inclined upper wall or slide having a ramp shape, such that the height of the basket varies gradually from a minimum to a maximum along its periphery, and an open vertical seat apt to accommodate a capsule arranged vertically and to distribute it through an opening made on the bottom wall of the container.

BRIEF DESCRIPTION OF THE DRAWINGS

Further features of the invention will be made clearer by the detailed description that follows, referring to its purely example and non-limiting embodiments, illustrated in the accompanying drawings, in which:

FIGS. 12a), b), c) are respectively plan, side and perspective views of a capsule that can be used in the device according to the invention;

DESCRIPTION OF THE PREFERRED EMBODIMENTS

Figure 1:
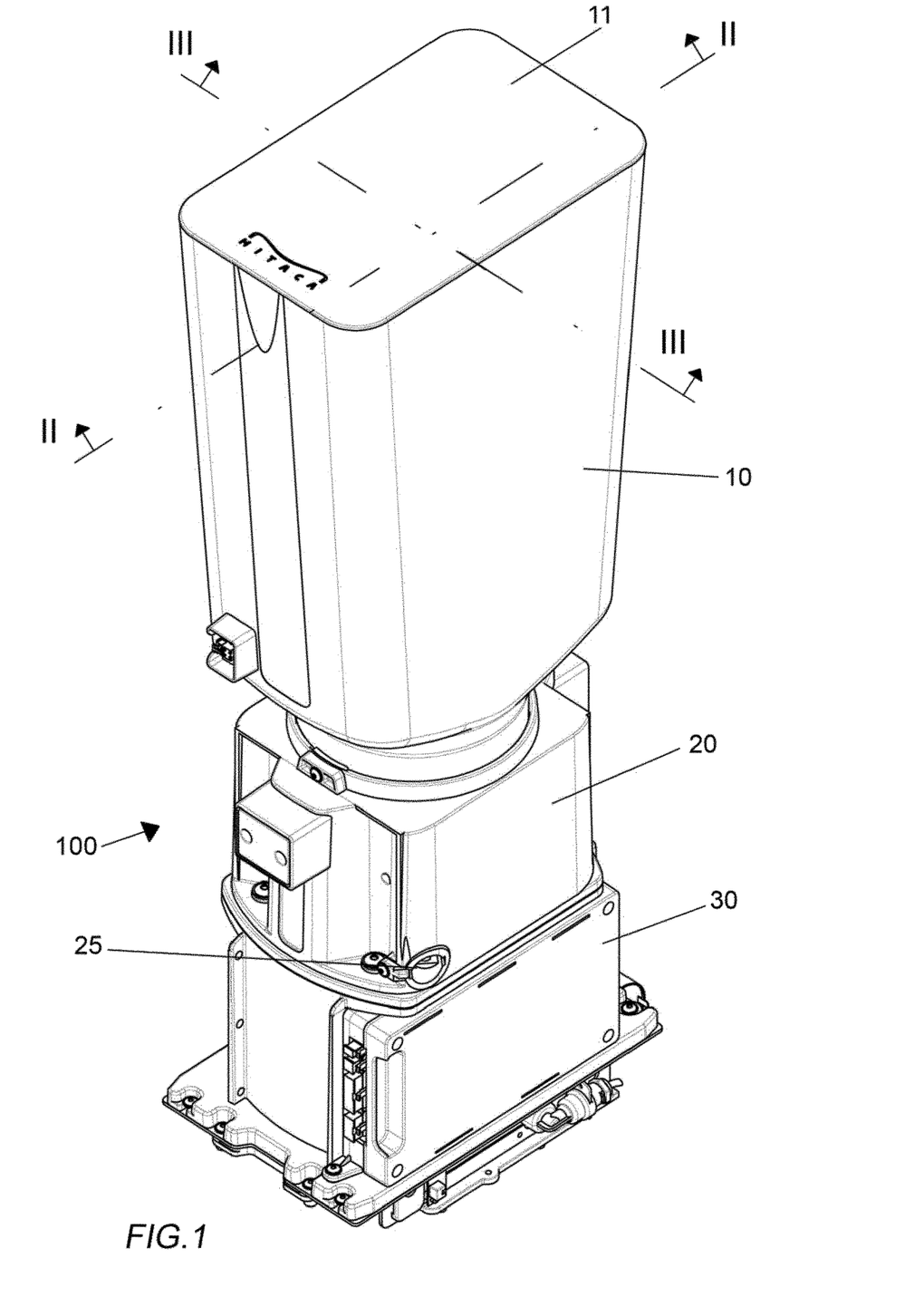
FIG. 1 is a perspective overall view of the device according to the invention, in its most complete form.
Figure 2:
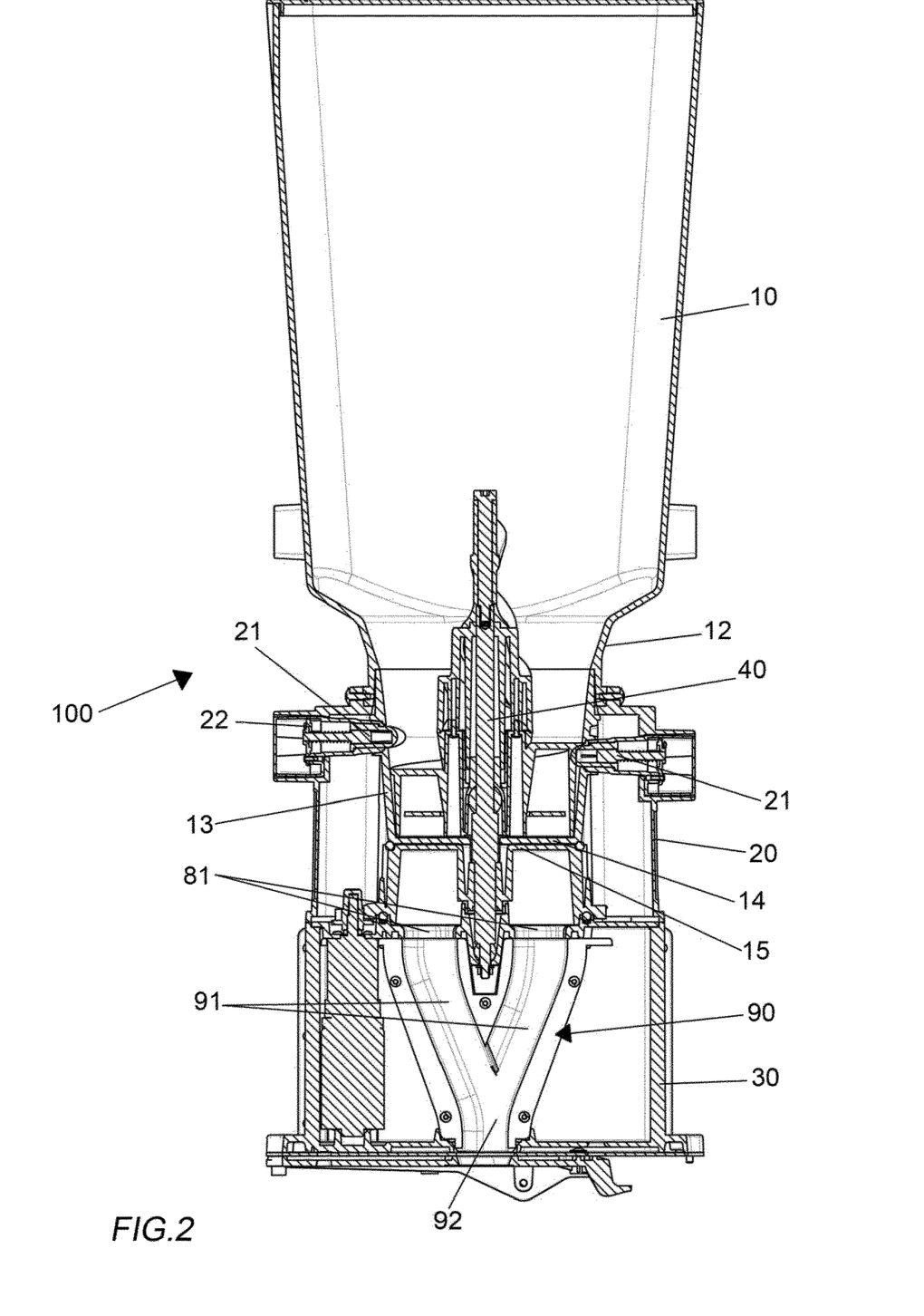
FIGS. 2 and 3 are sectioned views taken at 90° one in relation to the other, respectively along the planes of section II-II and III-III of FIG. 1.
Figure 3:
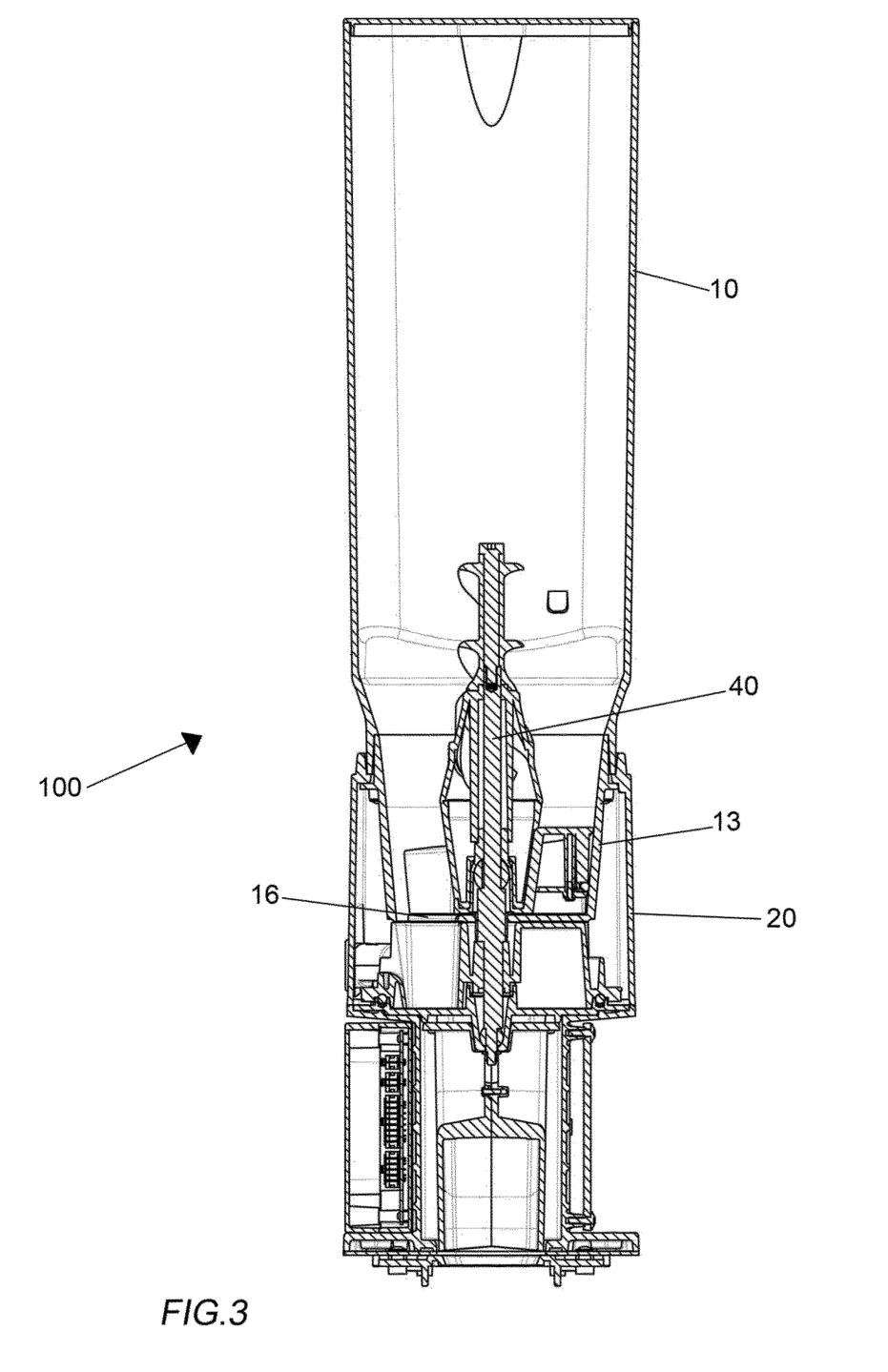

Referring to these drawings, and for the time being in particular to FIGS. 1 to 3, reference numeral 100 denotes, as a whole, a capsule distributing device according to the invention, in its most complete form, apt to distribute the capsules directly into the infusion assembly of a beverage distributing machine, on which the device 100 can be mounted.

Figure 12:
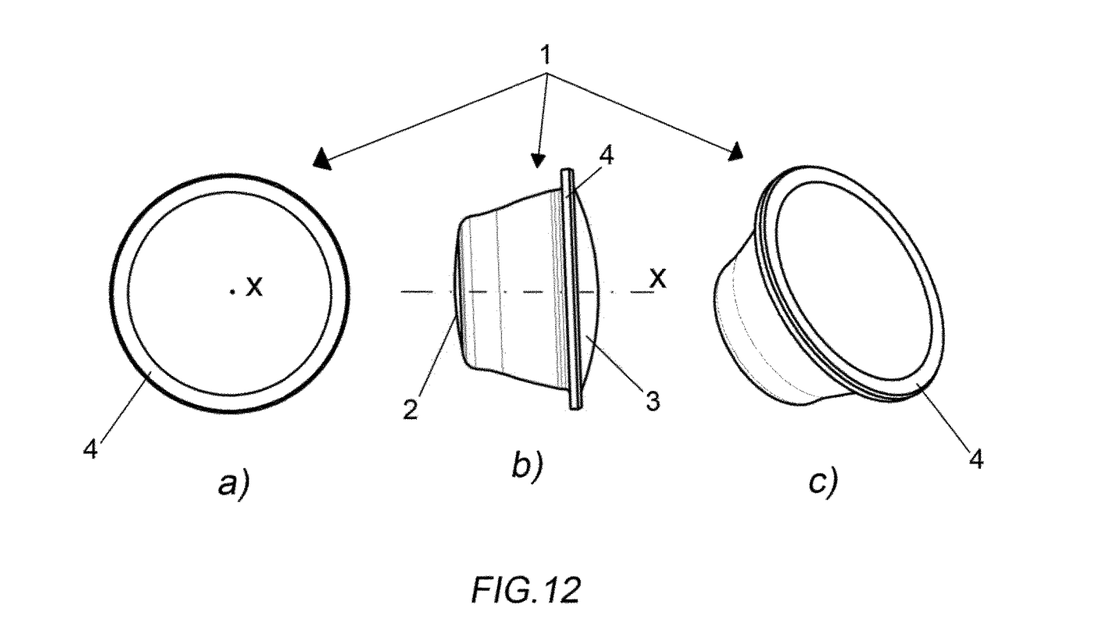

A capsule that can be used in the device according to the invention is shown in FIGS. 12a, 12b and 12c which are respectively a plan view, a side view and a perspective view, where it is denoted by reference numeral 1.

The capsule is shown in a substantially truncated cone shape, with a symmetry around an X axis (FIG. 12b) and has a smaller base 2 and a larger base 3, at which there is an annular edge protruding outwards 4.

Here below, capsule 1 will be considered horizontally placed when it is in the position shown in FIG. 12a, i.e. with the X axis vertical, while it is considered vertically placed when it is in the position of the side view of FIG. 12b, i.e. with the X axis horizontal.

Naturally, capsule 1 may have a different shape from that shown in FIGS. 12a-c, e.g. cylindrical, generally not perfectly regular.

Here below in this description the capsule 10 will be called irregularly shaped to indicate that, when placed vertically, that is, with the X axis horizontal, it can enter a seat that reproduces the shape thereof only with a well-defined orientation and not, for example, if orientated in the opposite direction. In other words, capsule 10 is irregularly shaped in that it does not have a constant radial dimension.

Capsules 1 are loaded in bulk, therefore with completely irregular and random packing in a tank or container 10, provided with a protective cover 11, in which is placed a capsules ordering assembly that will now be described.

Container 10 has an almost parallelepiped shape, slightly tapered downwards, where it is connected to a cylindrical section 12 with a decreasing diameter, which is joined to a lower tank 13, with a substantially circular section, having a bottom wall 14, with a central circular hole 15 and a substantially rectangular opening 16 (see in particular FIG. 3), of such dimensions as to allow a capsule to pass easily through it, as will be seen below.

Naturally, container 10 can be different in shape from the one shown and is provided separate from tank 13 for simplicity of construction and ease of assembly.

The tank 13, together with other components of the device that will be mentioned here below, is housed in a cover cap 20 placed on an internally hollow base 30.

Through said central hole 15 of the bottom 14 of the tank 13, which is fixed to the cover cap 20, and then to the base 30, passes a shaft 40, on which is keyed a basket 50 with an inclined plane or upper slide 51, whose function will be described in greater detail below.

A helical screw 60 is mounted on the basket 50, also integral with the shaft 40.

The helical screw 60, which is used to mix the capsules 1 in the container 10, has an increasing diameter from its upper tip to the base which is embedded in the basket 50.

In the drawings the screw 60 is shown made in two parts that are assembled together, but it is clear that it can be made in one piece.

Basket 50 has no bottom and therefore has a side wall 52 with a circular section and the aforementioned inclined upper wall or slide 51 which has a ramp shape, such that the height of the basket 50 gradually varies from a minimum to a maximum along its periphery.

Figure 13:
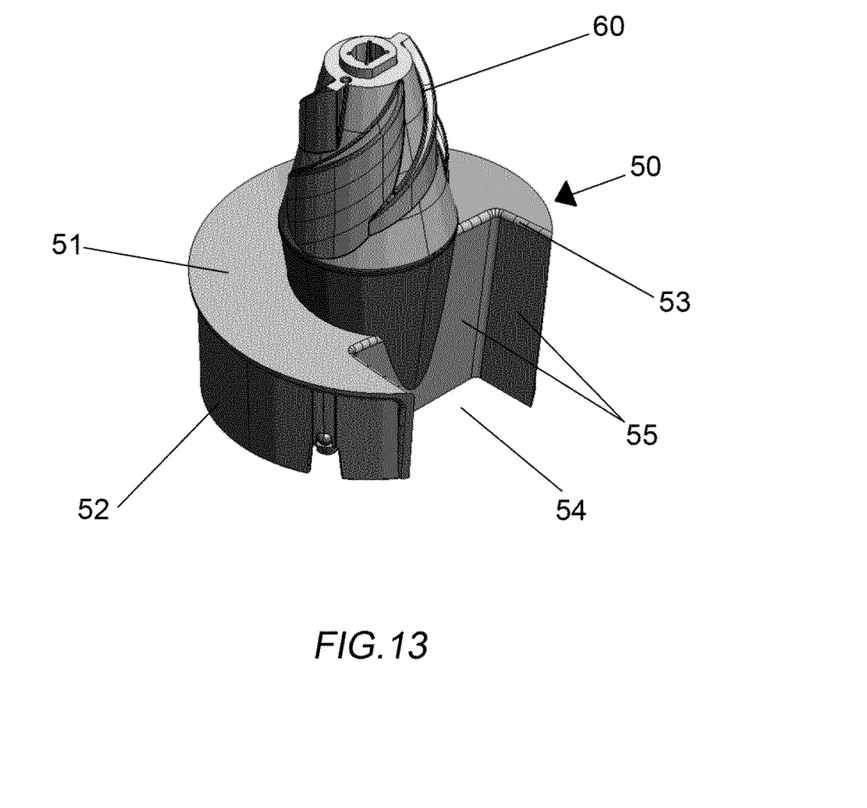
FIG. 13 is an enlarged perspective view of a detail of the assembly for ordering capsules vertically of the device according to the invention.

As can be seen more clearly in the enlargement of FIG. 13, the side wall 52 has an interruption, at which the inclined ramp shaped upper wall 51 has a large opening 53, such as to determine a seat 54 inside the basket, bounded by vertical walls 55, apt to accommodate a capsule 1 arranged vertically.

In the cap 20, under the basket 50, a dome-shaped body 70 is placed, in which the shaft 40 is keyed, and carrying below a gear 71, which can be actuated in rotation by a pinion 72 of a geared motor 73.

The dome-shaped body 70 has a vertical through opening 74 placed in alignment with the aforementioned seat 54 of the basket 50, and apt to accommodate a capsule 1. On the side wall of the dome 70, at said vertical through opening 74, a slit 75 is provided.

Below the dome-shaped body 70 with gear 71 a plate 80 is placed, provided with two aligned openings 81 orientated in the same direction and reproducing the shape of a capsule 1 placed vertically.

Below plate 80 a Y-shaped conveyor 90 is placed, comprising two ducts 91, which start from the above-mentioned openings 81 of the plate 80 and flow towards a single outlet duct 92, from which the capsules are distributed with a very precise orientation, as will be explained in greater detail here below, and fed, for example, to the distributing assembly of a machine for the production of drinks.

In the cap 20, in approximately diametrically opposed positions, two pushers 21 are inserted, protruding inside the tank 13 under the action of elastic means 22.

As can be seen, for example, in FIG. 2, said pushers 21 are placed at a level corresponding to the inclined plane 51 of the basket 50, such that, depending on the angular position of the basket 50, one of the two pushers 21, placed at the part of smaller height of the basket, protrudes inside the tank 13, while the other one is made to withdraw into the cap 20 at the part of greater height of the basket.

The operation of the device according to the invention for ordering, orientating and distributing capsules is now described.

Actuation of the geared motor 73 rotates the gear 71 of the dome-shaped body 70 by means of the pinion 72, and therefore the shaft 40 on which it is keyed, making the basket 50 and the helical screw 60 rotate synchronously.

The rotation of the helical screw 60 performs a mixing of the capsules 1 inserted in the container 10, facilitating the fall thereof into the tank 13.

The increase in diameter of the screw 60 towards its base reduces the distance between it and the side wall of the tank 13, such that a capsule 1 can enter the space between the screw and the side wall of the tank and therefore in the tank 13, accompanied by the rotation movement of the helical screw, only in the vertical direction, the maximum radial dimension of the capsule being greater than the axial one.

During the rotation of the basket 50, which is clockwise with reference to the accompanying drawings, a capsule 1 falls into the seat 54 of the basket through the upper opening 51, and is dragged onto the bottom 14 of the tank.

Figure 5:
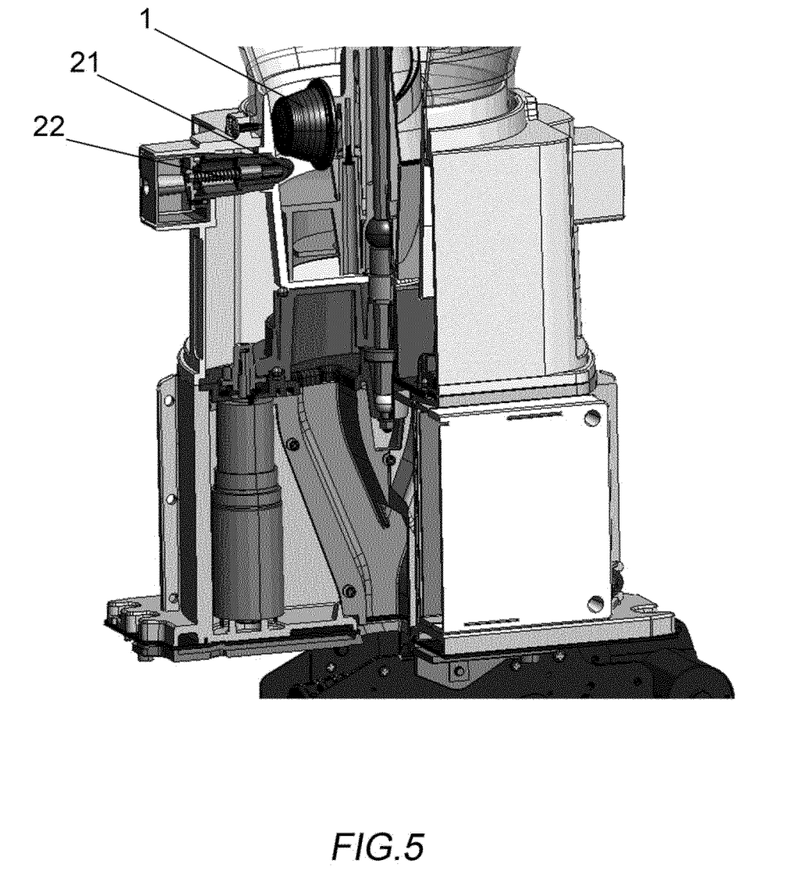
FIGS. 5 to 9 are partially cross section views like that of FIG. 4, showing successive positions of a capsule until insertion in the distributing assembly of a machine for preparing a drink.

To prevent a second capsule from partially entering the seat 54 in the basket and causing any jams, the abovementioned pushers 21 intervene, as for example shown in FIG. 5.

In fact, such a situation could occur when, during the rotation of the basket 50, a capsule 1 in the tank 13 is in the transition zone between the part of smaller height and the part of greater height of the basket, where the seat 54 is formed.

To avoid this, pusher 21 protrudes into tank 13, where basket 50 is lower in height, and lifts a capsule 1 located in that zone, as shown in FIG. 5, bypassing the aforementioned transition zone during the rotation of the basket and preventing it from partially inserting itself into seat 54 of the same.

The pusher 21 shown in FIG. 5 withdraws into the cap 20, in contrast to the action of the spring 22, when it interferes with the highest part of the basket.

The same situation occurs with the other pusher 21 placed at about 180° from the previous one.

It has been verified that the provision of two pushers optimally solves the problem of capsule jamming.

Figure 6:
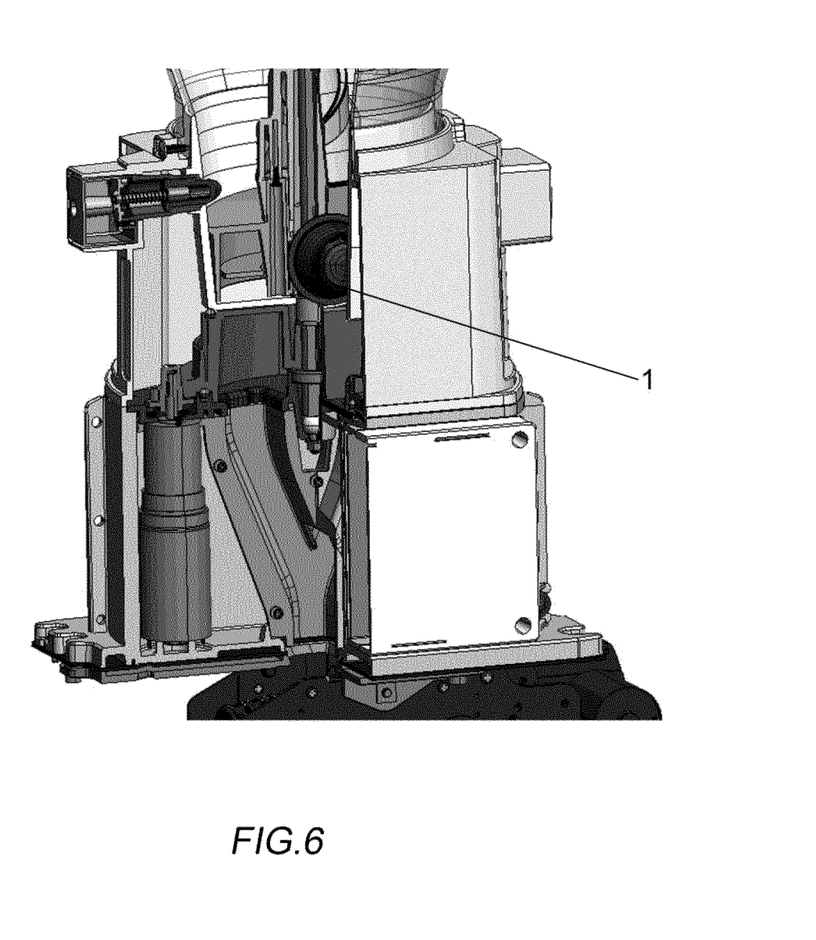

FIG. 6 shows a capsule 1 placed vertically in the seat 54 of the basket 50, during transport on the bottom 14 of the tank 13.

It should be noted that FIGS. 5 to 9 are "fictitious" views showing the device in a static situation, i.e. with the rotating assembly always in the same position, with a capsule shown in different positions, until delivery to the distributing assembly of an infusion machine.

Figure 7:
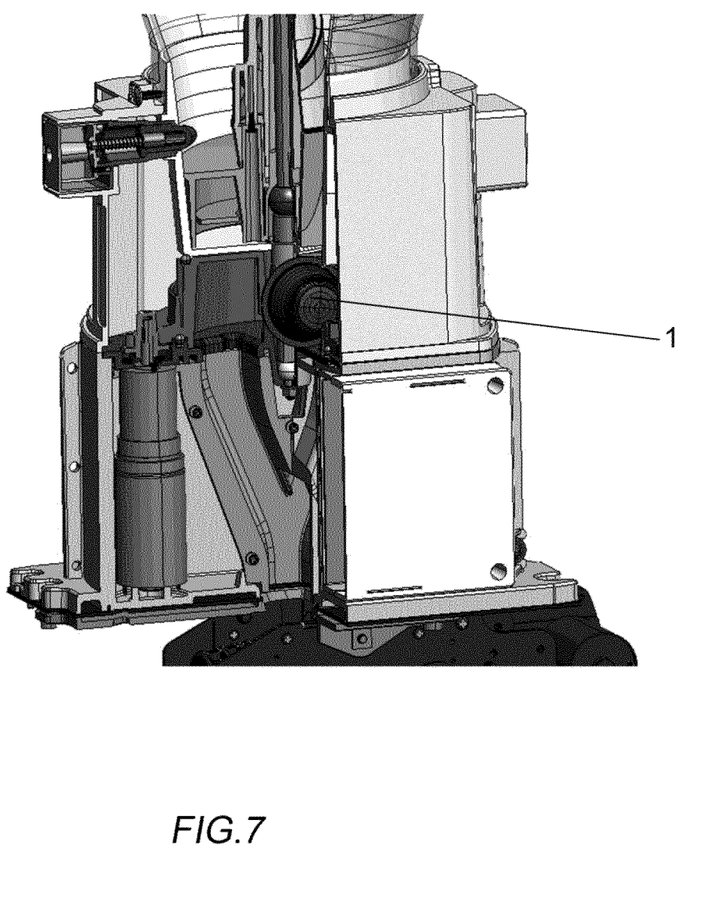

During the rotation of the basket 50, which takes place integrally to the underlying dome-shaped body 70, the capsule 1 placed in the seat 54, at a certain point, is located at the opening 16 provided on the bottom 14 of the tank 13, falling into the corresponding opening 74 of the dome-shaped body 70, which is in perfect alignment with the seat 54. The situation is schematically shown in FIG. 7.

Up to this point, capsule 1 is located on plate 80 located above the Y-shaped conveyor 90, in which plate two aligned openings 81 are provided, orientated in the same direction and reproducing the vertical shape of a capsule 1.

The capsules, after transiting from container 10 along the basket 50 and in the dome-shaped body 70, arrive on the plate 80 placed in a vertical position but with a random orientation, that is, in the case of capsules with a substantially truncated cone shape, as shown in the drawings, with the larger base turned indifferently in one direction or another.

Therefore, depending on how the capsule is orientated, it enters one or the other of the two shaped openings 81.

Figure 8:
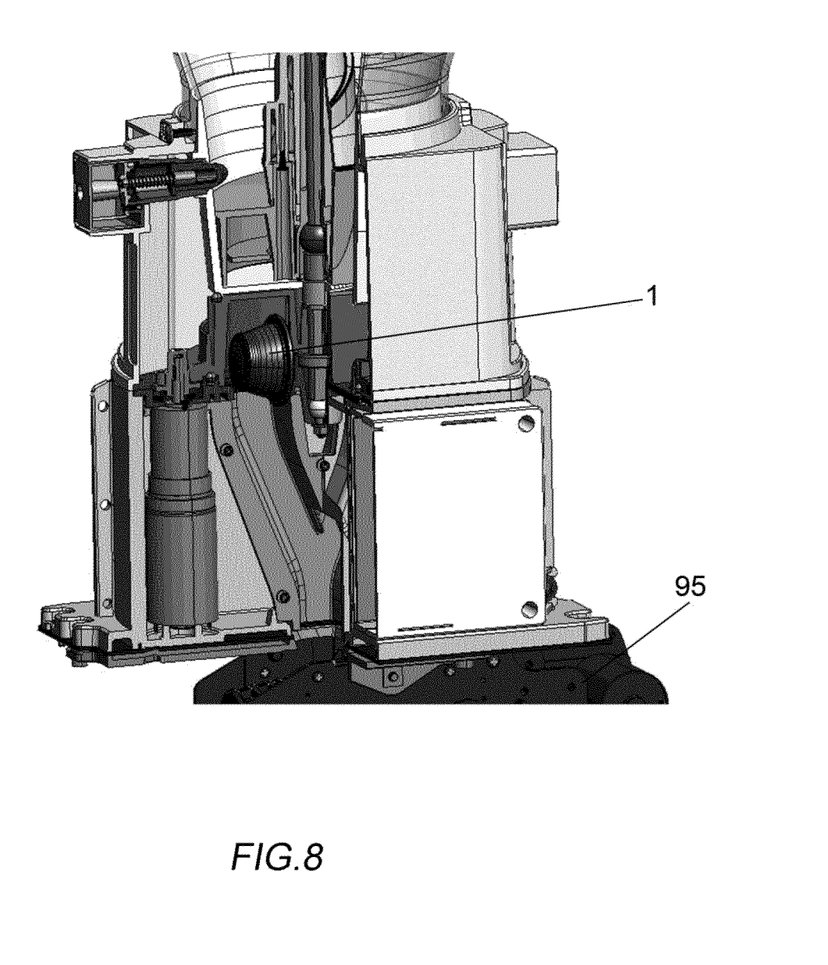
Figure 11:
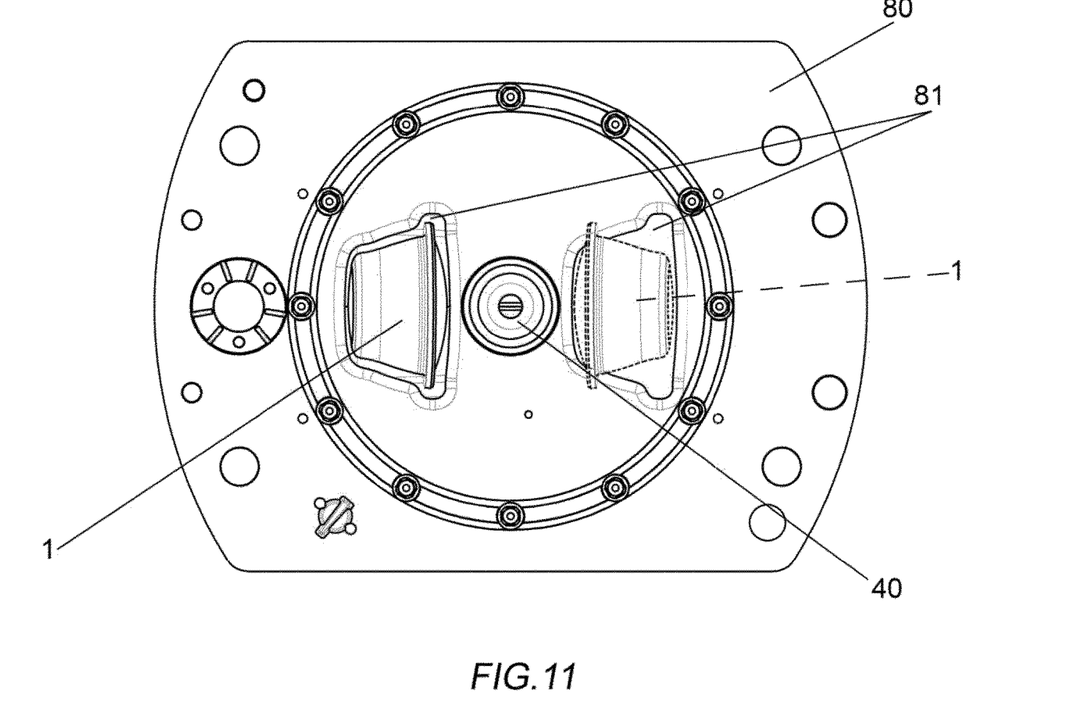
FIG. 11 is a plan view from above of the capsule conveyor towards the outlet, to better show how they are orientated.

In practice, if the capsule 1 falls on the plate 80 with an orientation as shown by dotted lines in FIG. 11, during the rotation of the dome-shaped body 70 it goes over the shaped opening 81 on the right in FIG. 11 and continues towards the opening 81 on the left, where it is correctly orientated, so that it can enter therein, as shown in FIGS. 8 and 11.

Figure 9:
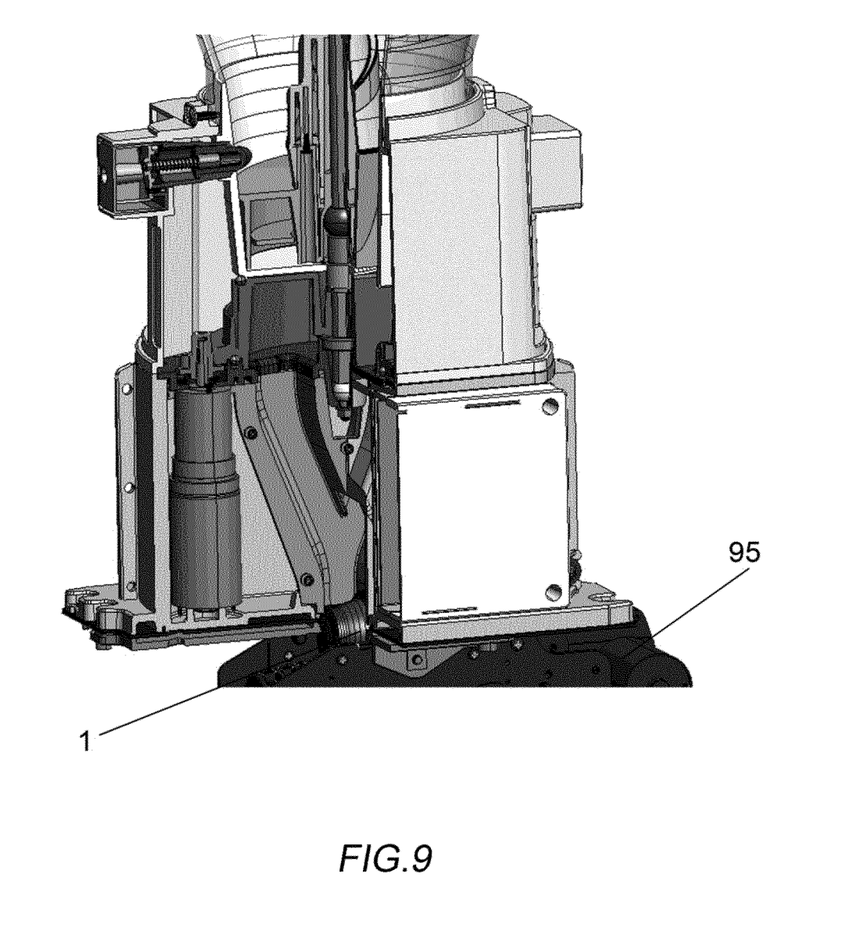
Figure 10A:
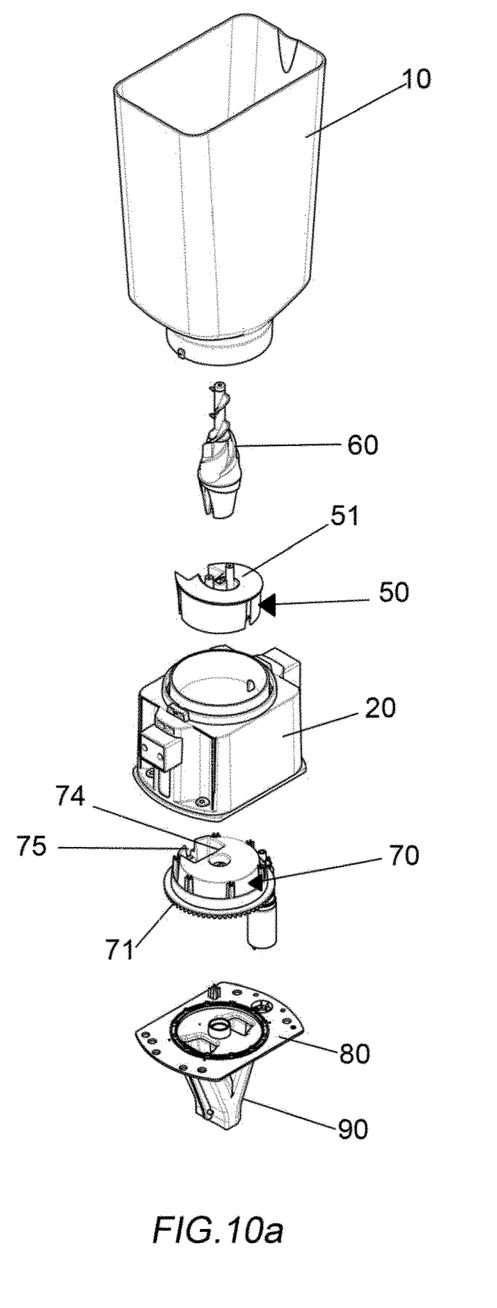
FIGS. 10a and 10b are blown-up views, respectively in perspective and section, showing the various components on the opposite side with respect to the previous drawings.
Figure 10B:
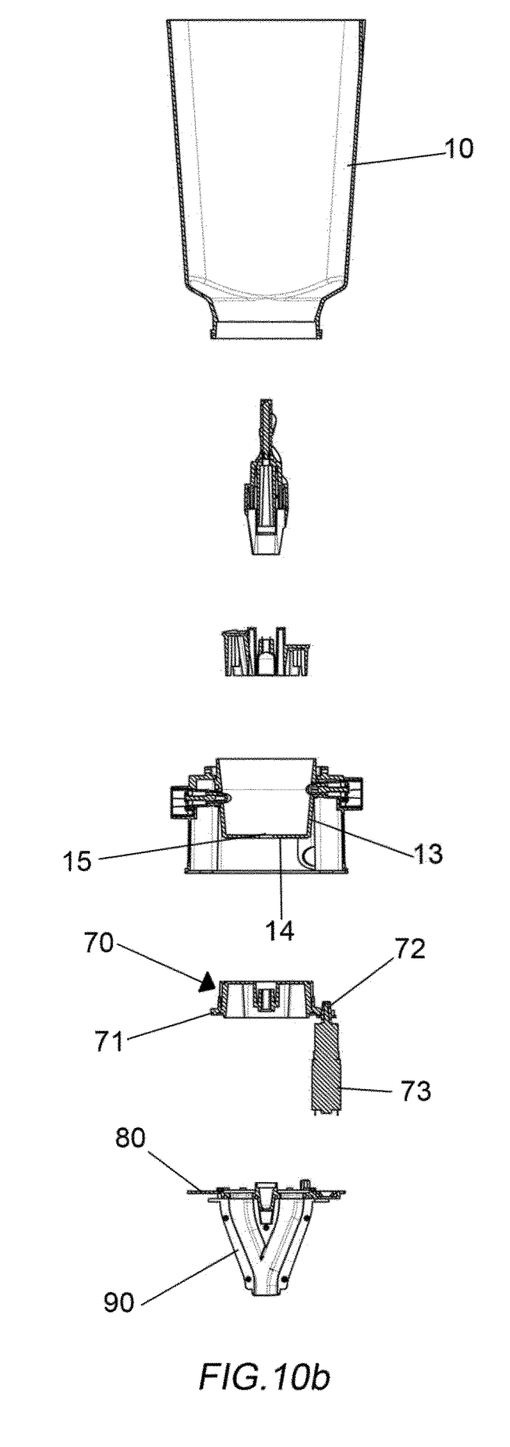

In the position shown in FIG. 8, capsule 1 falls into duct 91 on the left, flowing into outlet duct 92 to be fed, for example, to distributing assembly 95, only schematically and partially shown in FIG. 9, of a machine for the production of a drink.

The device according to the invention can be connected to a control logic such that, for example, on command from a user, by activating an appropriate button, a capsule is distributed.

Figure 4:
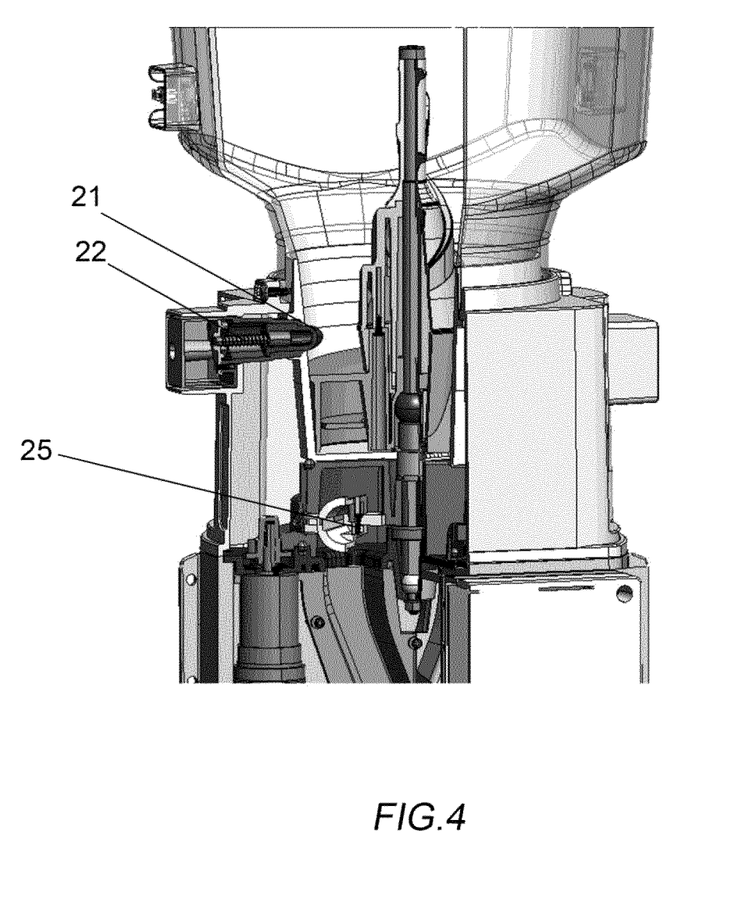
FIG. 4 is a partially cross section view to better show the main assemblies of the device.

For this purpose, a presence sensor 25, shown in FIG. 1 and in the cross section of FIG. 4, is placed in cap 20 to detect the presence of a capsule on plate 80, through the slit 75 of the side wall of the dome 70, stopping the rotation of the gear 71.

In this way, a capsule 1 is prepared in order to enter one of the two ducts 91 of the Y-shaped conveyor 90 at the next command given by the user and a new capsule is prepared for the next pickup.

Naturally the position of the sensor 25 is such that the capsule is stopped on the plate 80 in a position where no shaped openings 81 are provided.

The advantages of the device according to the invention appear clear from the above which, starting from capsules loaded in bulk, is able to order and orientate them so as to be individually fed to the distributing assembly of a machine for the production of a drink.

The device described above can be used not in combination with a beverage machine, acting as a distributor of orientated capsules, distributed by the outlet duct 92 of the Y-shaped conveyor 90.

Figure 14:
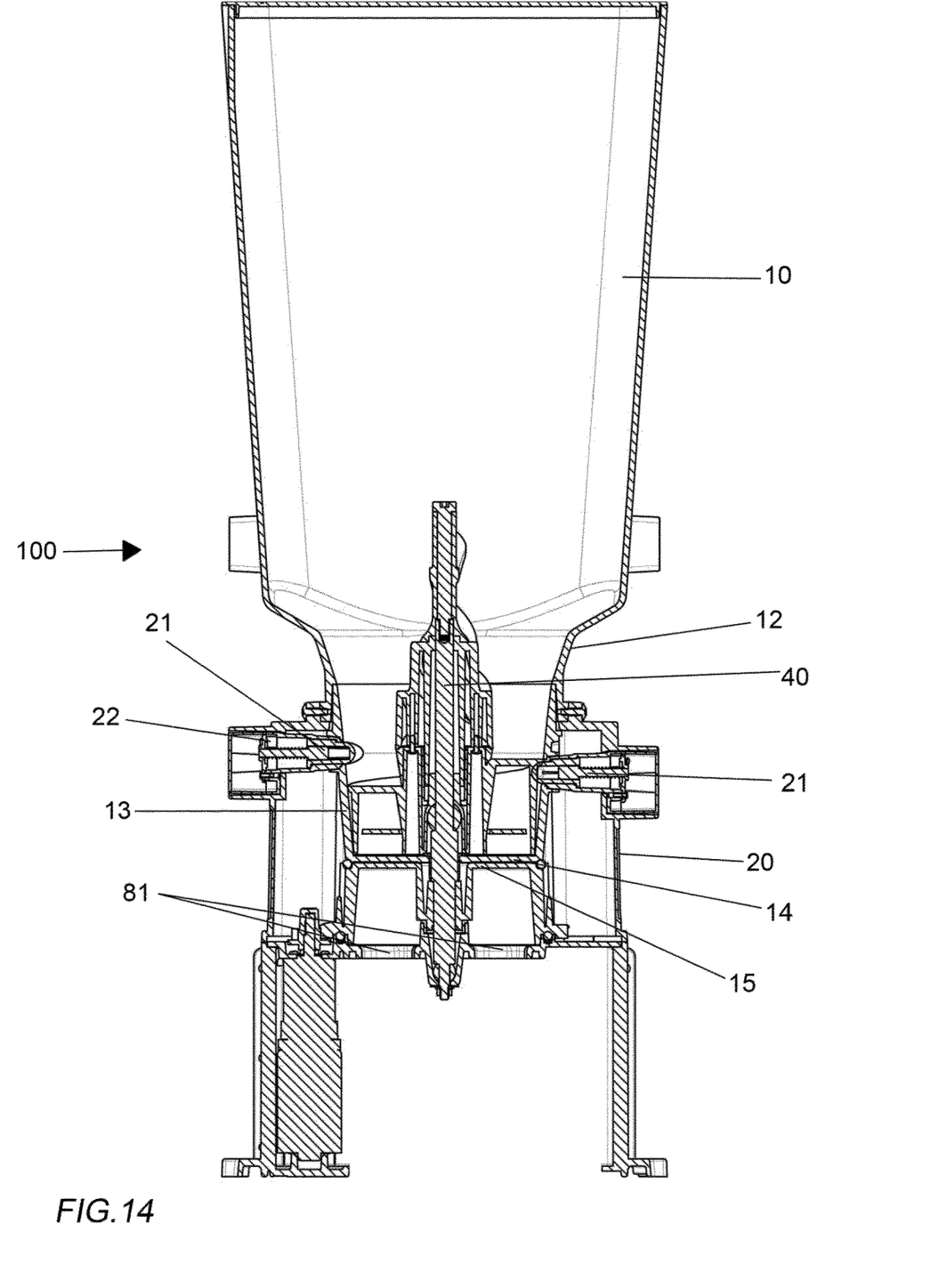
FIG. 14 is a section view like that of FIG. 2, showing a simplified embodiment of the capsule distributor according to the invention.

FIG. 14 is a section view like that of FIG. 2, showing a simplified embodiment of the capsule distributor according to the invention, without the Y-shaped conveyor 90.

According to this embodiment, the capsules 1, starting from container 10, where they are loaded in bulk, perform the transit previously described in order to be distributed by one or the other of the two shaped openings 81 of plate 80 with the same pre-set orientation.

FIG. 15 is again a section view like that of FIG. 2, showing a further simplified embodiment of the capsule distributor according to the invention, without, in addition to the Y-shaped conveyor 90, also the plate 80, so that the capsules 1 are distributed vertically, with a random orientation, passing through the opening 16 provided on the bottom of the tank 13 and the opening 74 of the dome-shaped body 70. In this case, sensor 25 detects the passage of a capsule and stops rotation of the gear 71.

Figure 15:
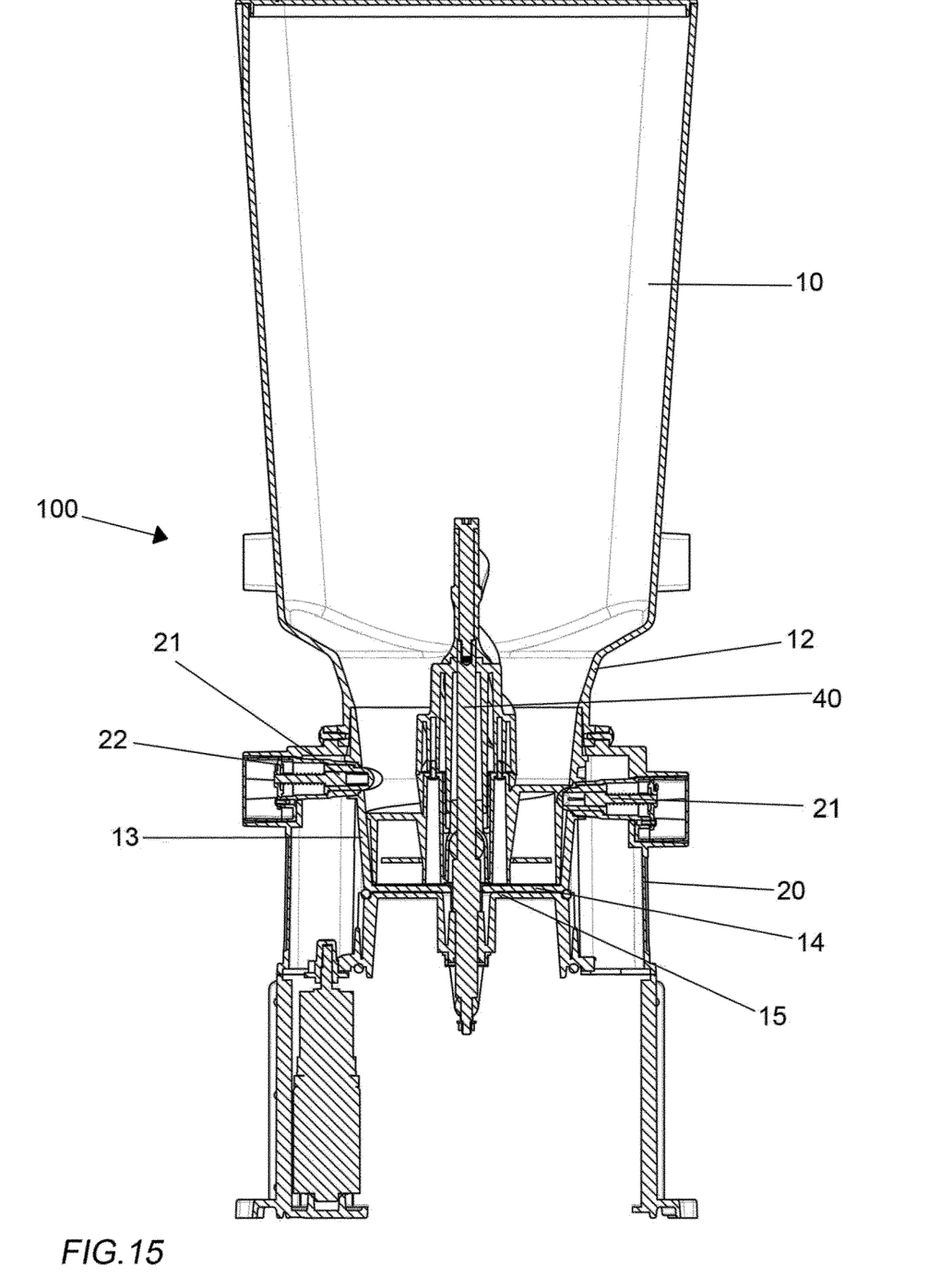
FIG. 15 is again a section view like that of FIG. 2, showing a further simplified embodiment of the capsule distributor according to the invention.

The functioning of the device according to the simplified embodiments of FIGS. 14 and 15 is the same as that described with reference to the more complete embodiment illustrated in FIGS. 1 to 13, as also the component parts are the same as those illustrated in these drawings, so that a detailed description of the functioning and of the structure of these embodiments has been omitted.

Naturally the invention is not limited to the particular embodiments previously described and illustrated in the accompanying drawings, but numerous detail changes may be made thereto within the reach of the person skilled in the art, without thereby departing from the scope of the invention itself, as defined in the appended claims.

The invention claimed is:

1. Device for distributing capsules, comprising a container able to receive in bulk a plurality of capsules and an ordering assembly arranged inside said container, apt to vertically arrange said capsules for subsequent distribution; wherein said ordering assembly comprises a rotating helical screw for stirring capsules, mounted on a basket rotating with it, said screw having a diameter growing from its upper tip as far as a base, and said basket having an inclined upper wall or slide, having a ramp development, such that the height of the basket varies gradually from a minimum to a maximum along its periphery, and an open vertical seat suitable for receiving a capsule arranged vertically and distributing it through an opening formed on a bottom wall of the container.

2. The device according to claim 1, wherein the distance between the base of said helical screw and the side wall of the container is such that it can accommodate a capsule only if arranged vertically, the horizontal dimension of the capsule being greater than the vertical one.

3. The device according to claim 1, further comprising at least one pusher projecting internally of said container under the action of elastic means at a level corresponding to said inclined plane of the basket, so as to lift a capsule preventing the capsule from overlapping another said capsule present in said seat of the basket, and returning when the pusher interferes with the higher part of the basket during rotation of the basket.

4. The device according to claim 1, also comprising a dome-shaped body arranged below said container and rotating in synchronism with said basket, and having a through opening delimited by vertical walls, in alignment with said seat of the basket, apt to receive a capsule arranged vertically.

5. The device according to claim 4, wherein underneath said dome-shaped body there is also provided an underlying plate provided with two aligned openings, orientated in the same direction and reproducing the shape of a capsule arranged vertically, each one apt to receive a capsule from said dome-shaped body during rotation of the dome-shaped body, according to the random orientation in which the capsule is arranged in the opening of the dome-shaped body, so as to distribute the capsules with the same orientation from any one of the aforesaid two openings.

6. The device according to claim 5, further comprising a Y-shaped conveyor comprising two ducts which depart from the aforesaid openings of the plate and flow towards a single outlet duct, apt to distribute the capsules with the orientation determined by said openings.

7. The device according to claim 4, wherein said dome-shaped body carries a gear at a base of the dome-shaped body which can be rotated by a pinion of a geared motor, said dome-shaped body being keyed on a shaft on which said basket is also keyed with the helical screw.

8. The device according to claim 7, also comprising a sensor, suitable for detecting the presence or passage of a capsule to stop rotation of the gear.

9. The device according to claim 6, mounted on a beverage production machine, so that said capsules are fed with a predetermined orientation to such a machine.

10. The device according to claim 1, further comprising a capsule orientating assembly for a distribution of said capsules with a given orientation, wherein said orientating assembly comprises a plate provided with two aligned openings, orientated in the same direction and reproducing the shape of a capsule arranged vertically, each one apt to receive a capsule, according to the random orientation in which the capsule is arranged on the plate and made to circulate in a circle thereon, below said plate being possibly provided a Y-shaped conveyor comprising two ducts which depart from the aforesaid openings of the plate and flow towards a single outlet duct with the orientation determined by said openings.

11. The device according to claim 2, further comprising at least one pusher projecting internally of said container under the action of elastic means at a level corresponding to said inclined plane of the basket, so as to lift a capsule preventing the capsule from overlapping another said capsule present in said seat (54) of the basket, and returning when the pusher interferes with the higher part of the basket during rotation of the basket.

12. The device according to claim 2, also comprising a dome-shaped body arranged below said container and rotating in synchronism with said basket, and having a through opening delimited by vertical walls, in alignment with said seat of the basket, apt to receive a capsule arranged vertically.

13. The device according to claim 3, also comprising a dome-shaped body arranged below said container and rotating in synchronism with said basket, and having a through opening delimited by vertical walls, in alignment with said seat of the basket, apt to receive a capsule arranged vertically.

14. The device according to claim 5, wherein said dome-shaped body carries a gear at a base of the dome-shaped body which can be rotated by a pinion of a geared motor, said dome-shaped body being keyed on a shaft on which said basket is also keyed with the helical screw.

15. The device according to claim 6, wherein said dome-shaped body carries a gear at a base of the dome-shaped body which can be rotated by a pinion of a geared motor, said dome-shaped body being keyed on a shaft on which said basket is also keyed with the helical screw.

16. The device according to claim 7, mounted on a beverage production machine, so that said capsules are fed with a predetermined orientation to such a machine.

17. The device according to claim 8, mounted on a beverage production machine, so that said capsules are fed with a predetermined orientation to such a machine.

18. The device according to claim 11, also comprising a dome-shaped body arranged below said container and rotating in synchronism with said basket, and having a through opening delimited by vertical walls, in alignment with said seat of the basket, apt to receive a capsule arranged vertically.

19. The device according to claim 14, mounted on a beverage production machine, so that said capsules are fed with a predetermined orientation to such a machine.

20. The device according to claim 15, mounted on a beverage production machine, so that said capsules are fed with a predetermined orientation to such a machine.

\* \* \* \* \*